United States Patent
Xiang

(10) Patent No.: US 11,520,789 B2
(45) Date of Patent: Dec. 6, 2022

(54) CACHING OBJECTS FROM A DATA STORE

(71) Applicant: TERADATA US, INC., San Diego, CA (US)

(72) Inventor: Yang Xiang, San Diego, CA (US)

(73) Assignee: Teradata US, Inc., San Diego, CA (US)

(*) Notice: Subject to any disclaimer, the term of this patent is extended or adjusted under 35 U.S.C. 154(b) by 110 days.

(21) Appl. No.: 16/918,028

(22) Filed: Jul. 1, 2020

(65) Prior Publication Data

US 2021/0117427 A1 Apr. 22, 2021

Related U.S. Application Data

(60) Provisional application No. 62/924,053, filed on Oct. 21, 2019.

(51) Int. Cl.
| | | |
|---|---|---|
| *G06F 15/16* | (2006.01) | |
| *G06F 16/2455* | (2019.01) | |
| *G06F 16/2457* | (2019.01) | |
| *G06F 16/17* | (2019.01) | |
| *G06F 16/2453* | (2019.01) | |

(52) U.S. Cl.
CPC .... *G06F 16/24552* (2019.01); *G06F 16/1734* (2019.01); *G06F 16/24532* (2019.01); *G06F 16/24539* (2019.01); *G06F 16/24573* (2019.01)

(58) Field of Classification Search
None
See application file for complete search history.

(56) References Cited

U.S. PATENT DOCUMENTS

| | | | |
|---|---|---|---|
| 7,966,324 B2* | 6/2011 | Sathe | G06F 16/9535 707/732 |
| 8,375,193 B2 | 2/2013 | Carrillo et al. | |
| 8,458,428 B2 | 6/2013 | Frazier et al. | |
| 2009/0150135 A1* | 6/2009 | Cressman | G06F 30/33 711/E12.008 |
| 2009/0164742 A1* | 6/2009 | Wach | G06F 11/2084 711/E12.103 |
| 2010/0185607 A1* | 7/2010 | Shao | G06F 16/68 707/723 |
| 2011/0153687 A1* | 6/2011 | Bacher | G06F 16/22 707/812 |
| 2012/0254111 A1* | 10/2012 | Carmichael | G06F 16/134 707/627 |
| 2014/0379835 A1* | 12/2014 | Foerster | H04L 67/325 709/213 |
| 2017/0147579 A1* | 5/2017 | Foerster | G06F 16/9537 |
| 2017/0220476 A1* | 8/2017 | Qi | G06F 12/0888 |
| 2018/0081821 A1* | 3/2018 | Beaverson | G06F 3/0604 |

(Continued)

OTHER PUBLICATIONS

Wikipedia, Microsoft Azure last edited Nov. 22, 2019 (8 pages).

(Continued)

*Primary Examiner* — Alex Gofman
(74) *Attorney, Agent, or Firm* — Trop, Pruner & Hu P.C.

(57) ABSTRACT

In some examples, a database management node updates object metadata with indicators of access frequencies of a plurality of objects in a data store that is remotely accessible by the database management node over a network. The database management node selects a subset of the plurality of objects based on the indicators, and caches the subset in the local storage.

18 Claims, 4 Drawing Sheets

(56) References Cited

U.S. PATENT DOCUMENTS

2018/0097906 A1\* 4/2018 Hakansson ........... H04L 9/0825
2020/0201768 A1\* 6/2020 Odhiambo .......... G06F 11/3037

OTHER PUBLICATIONS

Wikipedia, Materialized view last edited Sep. 5, 2019 (5 pages).
Wikipedia, Google Storage last edited Nov. 2, 2019 (2 pages).
Wikipedia, Amazon S3 last edited Nov. 26, 2019 (8 pages).
Wikipedia, NVM Express last edited May 16, 2020 (12 pages).
Teradata US, Inc., U.S. Appl. No. 16/724,724 entitled Using Materialized Views to Respond to Queries filed Dec. 23, 2019 (27 pages).

\* cited by examiner

CACHING OBJECTS FROM A DATA STORE

CROSS REFERENCE TO RELATED APPLICATION

This application claims the benefit of U.S. Provisional Application No. 62/924,053, filed Oct. 21, 2019, which is hereby incorporated by reference in its entirety.

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the DBMS. A query can also be issued to insert new entries into a table of a database (such as to insert a row into the table), modify the content of the table, or to delete entries from the table. Examples of SQL statements include SELECT, INSERT, UPDATE, and DELETE.

In other examples, object stores can be used to store objects that can have a different form than rows of a table in a relational DBMS. The object stores can be provided in a cloud that is accessible over a network, for example. In some cases, objects may be stored more cheaply in an object store, and are more readily available over a network.

BRIEF DESCRIPTION OF THE DRAWINGS

Some implementations of the present disclosure are described with respect to the following figures.

Figure 1:
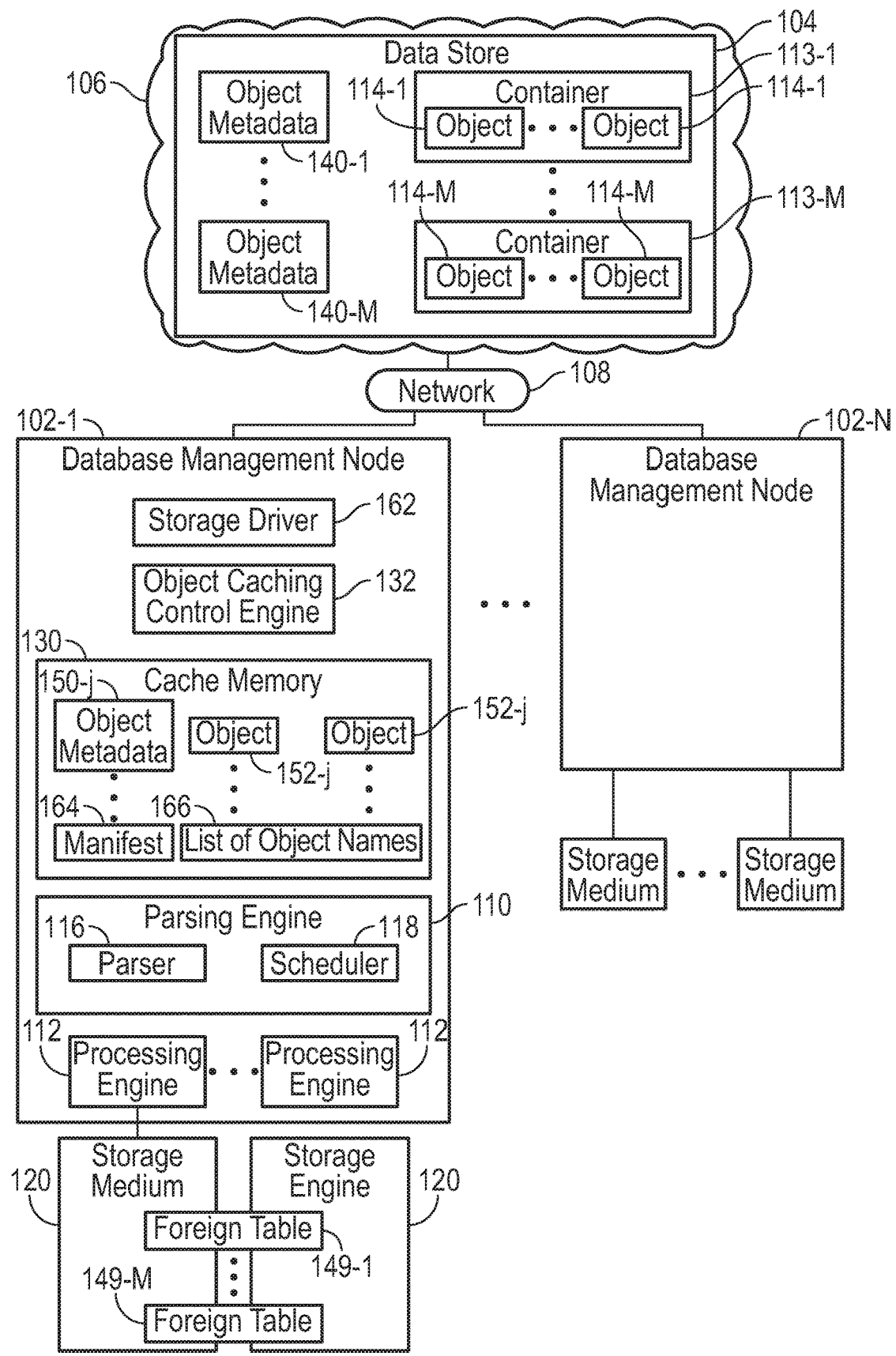
FIG. 1 is a block diagram of an example arrangement that includes database management nodes and an object-based remote data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes database management nodes 102-1 to 102-N (where N≥1) and a remote data store 104. Note that in some examples, just one database management node is present. A "node" can refer to a computer or a collection of computers, where each computer can include one or more processors. A processor can include a microprocessor, a core of a multi-core microprocessor, a microcontroller, a programmable integrated circuit, a programmable gate array, or another hardware processing circuit. The database management node(s) is (are) part of a relational database management system (DBMS).

In some examples, the data store 104 is an object store that stores objects. The data store 104 can be implemented using one or more storage devices, such as a disk-based storage device, a solid state storage device, and so forth.

As used here, an "object" can refer to any separately identifiable or addressable unit of data. In some examples, an object may also be referred to as a blob. Generally, an object can store data records in a form that is different from a relational table that is used in a relational DBMS. When an object is loaded from the data store 104 into a database management node 102-$i$ ($i$=1 to N), the data records in the object can be populated into one or more tables stored by the database management node 102-$i$.

In the example of FIG. 1, the data store 104 stores objects in respective containers 113-1 to 113-M (M≥1). Although multiple containers are shown in FIG. 1, in other examples, the data store 104 can include just one container, or alternatively, the concept of containers is not employed by the data store 104. Each container 113-$j$ ($j$=1 to M) includes one or more objects 114-$j$. Generally, a "container" can refer to a data structure (analogous to a directory) that can contain further data, such as the objects shown in FIG. 1.

The objects 114-$j$ of the data store 104 can have variable sizes, and each object can have a size between 10 megabytes (MB) and 100 MB and possibly up to a few terabytes (TB), for example. In other examples, an object can have a smaller or larger size. An object in an object store is typically larger in size than data records (e.g., rows, tables, etc.) stored in a local storage (e.g., 120 in FIG. 1) of a DBMS.

In some examples, the data store 104 can be provided in a cloud 106. A "cloud" can refer to any infrastructure, including computing, storage, and communication resources, that can be accessed remotely by computing devices over a network, such as a network 108 shown in FIG. 1. Alternatively, the data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The following describes components of the database management node 102-1. The database management node 102-N has the same or similar components.

The database management node 102-1 includes a parsing engine 110 that is able to process SQL queries, including data definition language (DDL) statements and data manipulation language (DML) statements. More generally, the parsing engine 110 is able to process database queries received from requesters (not shown), which can include users or programs in client computing devices. The client computing devices may be coupled to the relational DBMS (including the database management nodes 102-1 to 102-N) over a network, such as the network 108.

In addition to the parsing engine 110, the database management node 102 includes multiple processing engines 112. In other examples, the database management node 102-1 can include just one processing engine 112.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Traditionally, a DBMS (e.g., a database management node) stores data in relational databases in a local block-based storage, in which data is stored as blocks that are smaller in size than objects of object stores. For example, a block-based storage (e.g., storage media 120 shown in FIG. 1) can include one or more disk-based storage devices, one or more solid state storage devices, and so forth.

The block-based storage (e.g., storage media 120 shown in FIG. 1) can be connected to the database management node over a relatively high-speed communication link (and possibly through one or more switches or routers or other network devices), such that the database management node can access (read or write) data in a relational database with relatively low input/output (I/O) latency (i.e., the delay between a time that a data request is submitted and a time that the data request is satisfied at the block-based storage is relatively low). The block-based storage can be considered a local storage of the DBMS, since the DBMS is able to access the block-based storage with relatively low I/O latency.

Although FIG. 1 depicts the storage media 120 as being outside of the database management node 102-1, it is noted that the storage media 120 can be included in the database management node 102-1 in other examples.

In some examples, instead of or in addition to coupling local block-based storage to the database management node 102-1, the database management node 102-1 can access the data store 104, which can be provided in the cloud 106 or another remote computing environment.

The multiple processing engines 112 are able to execute in parallel to request access of different data portions in the storage media 120 and/or in the data store 104. The processing engines 112 executing in parallel can allow for fuller utilization of the available bandwidth over the network 108 to the data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

When responding to a database query, the database management node 102-1 can retrieve one or more objects 114-*j* from the data store 104. In some examples, accessing data of the data store 104 can have a higher I/O latency than accessing data of the local block-based storage.

The parsing engine 110 of the database management node 102-1 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more requesters. The parser 116 parses each received database query, and generates executable steps for the parsed query. The parser 116 includes an optimizer (not shown) that generates multiple query plans in response to a query. The optimizer selects the most efficient query plan from among the multiple query plans. Each query plan includes a sequence of executable steps to perform to process the database query. In some examples, the optimizer can prefetch a number of objects (and associated size information) from the containers 113-1 to 113-M, so that the optimizer can plan workloads for database queries. The scheduler 118 sends the executable steps of the selected query plan to respective one or more processing engines 112.

Each processing engine 112 can perform the following tasks in response to SQL queries or other requests parsed by the parsing engine 110: inserts, deletes, or modifies contents of tables or other data records; creates, modifies, or deletes definitions of tables or other data records; retrieves information from definitions and tables or other data records; locks databases and tables or other data records; and so forth.

As used here, a "data record" can refer to any unit of data that can be written into the data store 104. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

The database management node 102-1 is able to access the remote data store 104 using foreign tables 149-1 to 149-M. In examples where containers are used in the data store 104, the foreign tables 149-1 to 149-M correspond to the respective containers 113-1 to 113-M. Each foreign table 149-*j* (j=1 to M) stores information identifying a storage location of the respective container 113-*j* in the remote data store 104. The foreign table 149-*j* does not include the actual data of the objects 114-*j* in the container 113-*j*, such that the foreign table 149-*j* is much smaller in size than the collection of the objects 114-*j* in the container 113-*j*.

As noted above, retrieving an object from the data store 104 may be associated with a higher I/O latency than retrieving data from a local storage, such as in the storage media 120.

Thus, if each database query is to be satisfied by retrieving objects from the data store 104, then database system performance can suffer due to the relatively larger amount of time involved in retrieving data from the data store 104.

Another issue is that the data store 104 may be operated by an operator that is different from an operator of the database management nodes 102-1 to 102-N. In some cases, the operator of the data store 104 may charge a price for accessing an object from the data store 104. As a result, retrieving data from the remote data store 104 may be costly if a large number of database queries are to be satisfied based on accessing data in the data store 104.

To improve database performance and to reduce cost, a cache memory 130 in the database management node 102-1 may be used to cache objects 114-*j* retrieved from the data store 104. A cache memory 130 can be implemented using a memory device or a collection of memory devices. Examples of a memory device that can be used to implement the cache memory can include a flash memory device, a Non-Volatile Memory Express (NVMe) memory device, a solid state drive (SSD), and so forth. The memory device may be non-volatile. A non-volatile memory device maintains the data stored in the non-volatile memory device even when power is removed from the non-volatile memory device or from a system in which the non-volatile memory device is located.

The storage capacity of the cache memory 130 is limited, such that there is a caching threshold set to store objects in the cache memory 130. If the size of objects stored in the cache memory 130 exceeds the caching threshold, then no further objects can be stored in the cache memory 130.

Moreover, the cache memory 130 may be used for caching data for database queries that do not access objects in the data store 104. If too much of the cache memory 130 is used to store objects such that insufficient space exists for other types of data, then the performance of database queries that access the local storage (e.g., 120) but not the data store 104 may be adversely impacted.

In accordance of some implementations of the present disclosure, the database management node 102-1 includes an object caching control engine 132 that performs a temperature-aware caching of objects retrieved from the data store 104.

In some examples, an object metadata may be associated with each container 113-*j* in the data store 104. As shown in FIG. 1, the data store 104 includes multiple object metadata 140-1 to 140-M that are associated with respective containers 113-1 to 113-M. Each object metadata 140-*j* (j=1 to M) can include multiple entries associated with respective objects 114-*j* of the corresponding container 113-*j*. For example, the object metadata 140-1 includes entries for respective objects 114-1 in the container 113-1, and the object metadata 140-M includes entries for respective objects 114-M in the container 113-M.

When one or more objects 114-*j* of a container 113-*j* are retrieved by the database management node 102-1 from the data store 104, a copy of the corresponding object metadata 140-*j* is also retrieved from the data store 104 and stored in the cache memory 130. The version of the object metadata 140-*j* retrieved from the data store 104 and stored in the cache memory is represented as object metadata 150-*j*. Also, objects 114-*j* retrieved from the data store 104 and stored in the cache memory 130 are represented as objects 152-*j*.

Note that in some examples, the object metadata 140-1 to 140-M can be retrieved from the data store 104 into the cache memory 130 without having to also retrieve the corresponding objects 114-1 to 114-M. In this manner, the object metadata 140-1 to 140-M retrieved into the cache memory 130 (and stored as object metadata 150-1 to 150-M) can be used for temperature-based caching of objects as performed by the object caching control engine 132.

Although initially the object metadata 150-*j* is a duplicate copy of the object metadata 140-*j*, the database management node object metadata 150-*j* may be changed with respect to the data store object metadata 140-*j*.

Figure 2:
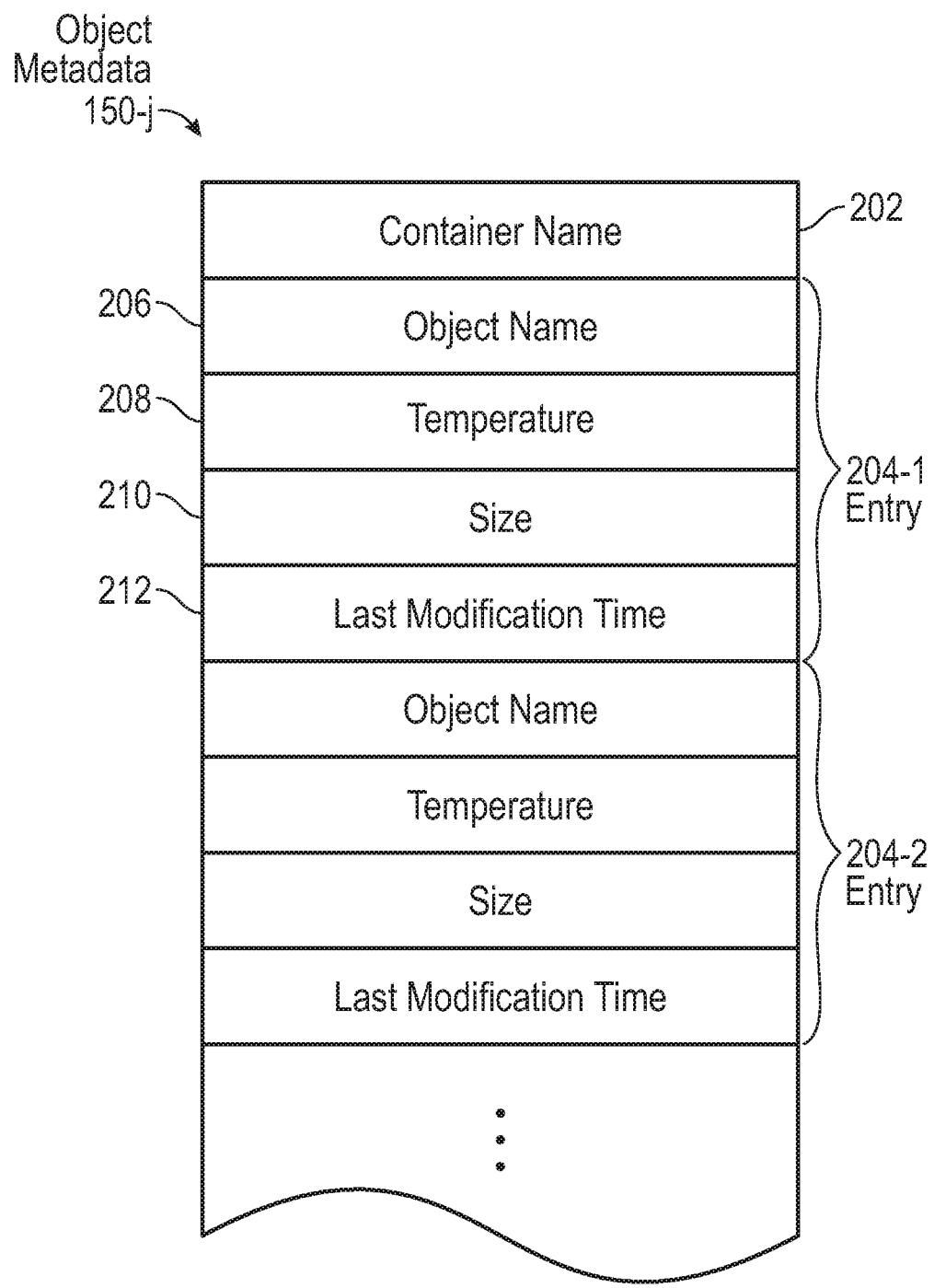
FIG. 2 is a block diagram of an object metadata according to some implementations of the present disclosure.

FIG. 2 illustrates an example of an object metadata 150-*j*. The object metadata 150-*j* includes a container name 202, which is the name of the container 113-*j* that the object metadata 150-*j* is associated with. The object metadata 150-*j* further includes multiple object metadata entries 204-1, 204-2, and so forth, for corresponding objects 114-*j* in the container 113-*j*. In some examples, the object metadata entry 204-1 for a respective object 114-1 includes the following fields: an object name field 206 (which includes a name of the object), a temperature field 208 (which includes a temperature indicating an amount of access of the object), a size field 210 (which includes a size of the object), and a last modification time field 212 (which includes a time that the object was last modified).

The remaining object metadata entries contain similar fields for other respective objects.

As used here, a "name" can refer to any identifier of a container or an object. The identifier can be in numeric form, alphanumeric form, alphabetic form, and so forth.

A "temperature" can refer to a value that quantifies an amount of access, such as an access frequency, of an object. An access frequency represents a quantity of accesses of the object over a given time interval. In some examples, a temperature can be expressed as a numeric value that varies proportionally or inversely proportionally with the access frequency. In other examples, a temperature can be set to any of multiple discrete values (discrete numeric values or discrete temperature bands) that represent the access frequency.

The object caching control engine 132 (FIG. 1) can update one or more of the temperature field 208, the size field 210, and the last modification time field 212 in a corresponding object metadata entry in response to an access (read access or write access) of a corresponding object 152-*j* in the cache memory 130 (or a corresponding object 114-*j* in the data store 104). The temperature stored in the temperature field 208 is the last updated temperature for the respective object 152-*j*.

Although a specific collection of fields is depicted in FIG. 2 for each object metadata entry, it is noted that in other examples, object metadata entries can have different collections of fields.

As further shown in FIG. 1, the database management node 102-1 includes a storage driver 162 that manages the access of the data store 104 in response to requests from the processing engines 112.

Although not shown, the database management node 102-1 further includes a network interface to allow the database management node 102-1 to communicate over the network 108. The network interface can include a communication transceiver to transmit and receive signals over the network 108. The communication transceiver can include a wired transceiver and/or a wireless transceiver to perform wired and/or wireless communications over the network 108.

When an object is loaded into the database management node 102-1 from the data store 104, a manifest 164 in the database management node 102-1 can be updated. The storage driver 162 is able to determine one or more tables (such as the foreign tables 150 to 150-M) to which the loaded object corresponds. The manifest 164 can maintain a mapping between each object loaded into the database management node 102-1 and corresponding tables. The corresponding tables may be stored in the storage media 120.

Figure 3:
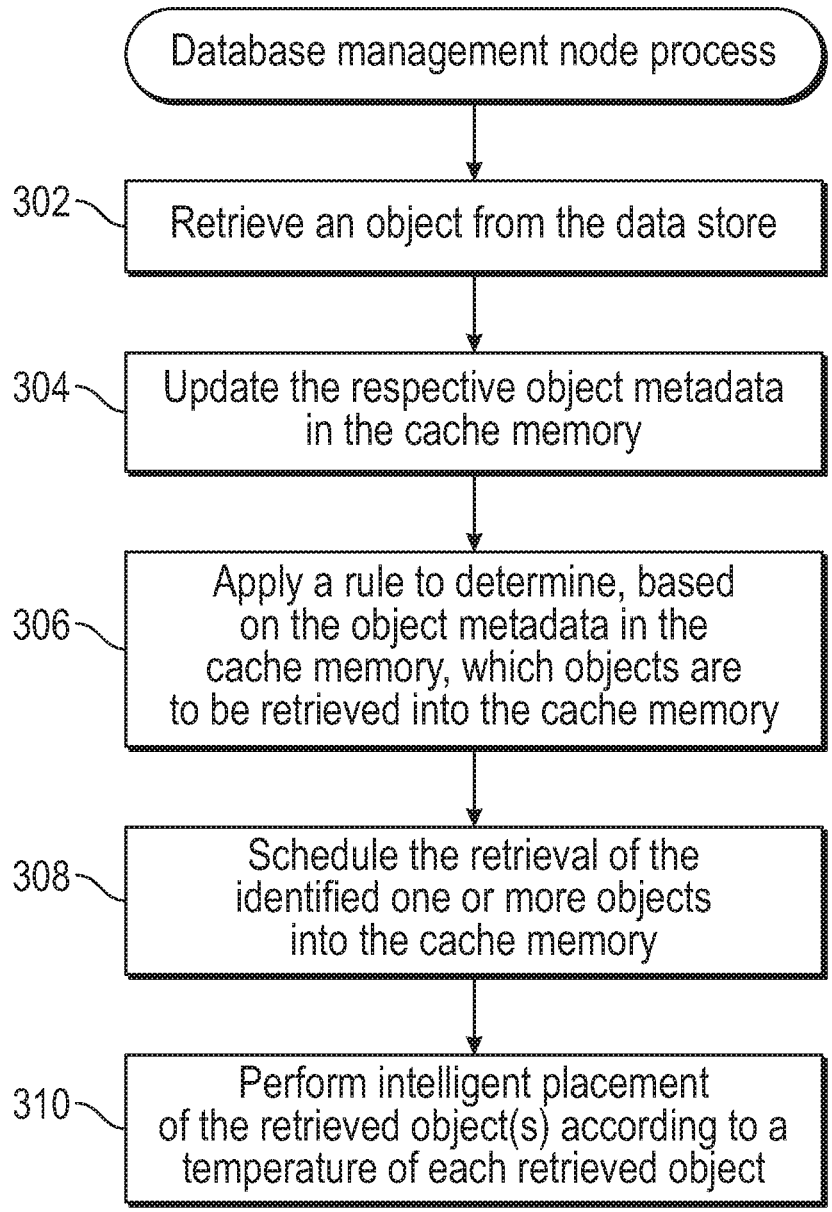
FIG. 3 is a flow diagram of a process of a database management node according to some implementations of the present disclosure.

FIG. 3 is a flow diagram of a process that can be performed by a database management node, such as any of the database management nodes 102-1 to 102-N shown in FIG. 1. In response to retrieving (at 302) an object from the data store 104, the object caching control engine 132 updates (at 304) the respective object metadata (e.g., 150-*j*) in the cache memory 130 of the database management node. The fields corresponding to each accessed object can be updated, such as fields of a corresponding one of the metadata object entries 204-1, 204-2, and so forth, shown in FIG. 2.

In other examples, instead of updating the object metadata in response to access of each object, the object metadata updates may be performed on a periodic or other timer-based basis.

Among the fields that are updated is the temperature field 208 of the respective object that is accessed. The value in the temperature field 208 is updated each time the respective object is accessed. The value in the temperature field 208 for a more frequently accessed object would indicate a "hotter" object than the value of the temperature field for another object that is less frequently accessed. The hotness of an object represents an amount of access (e.g., access frequency) of the object. The hotness of an object can be measured over some specified time interval, such as over the course of a day, a week, a month, or some other specified time duration.

The object caching control engine 132 can also update other fields in the object metadata entry for an accessed object, such as the size field 210, the last modification time field 212, and so forth.

In examples where the database management node includes multiple processing engines (e.g., 112 in FIG. 1), the updating of the respective object metadata in the cache memory 130 can be based on aggregating (e.g., averaging) statistics relating to access of the objects in the data store by the multiple processing engines. For example, if two or more of the multiple processing engines have accessed a given object, then the update of the temperature for the given object is based on aggregating (e.g., averaging) the amount of access (e.g., access frequency) of the given object by each of the two or more processing engines, and the aggregated amount of access is then used to compute the updated temperature for the given object.

More generally, statistics associated with the accesses of the given object by the two or more processing engines are aggregated for producing an aggregated statistic (e.g., temperature, etc.) that is then used to update the respective object metadata.

The object caching control engine 132 can apply (at 306) a rule to determine, based on the object metadata in the cache memory 130, which objects are to be retrieved from the data store 104 into the cache memory 130. The rule can be based on the temperature values of the objects, the sizes of the objects, a specified size of the portion of the cache memory 130 used to store objects, and any other criteria. Based on the rule, the object caching control engine 132 identifies one or more objects that are to be retrieved into the cache memory 130. For example, based on the rule, the object caching control engine 132 can sort the objects according to which ones are ranked higher for purposes of retrieving into the cache memory 130.

The ranking of the objects can be based on their respective temperature values. In further examples, the ranking of the objects can be based on their respective temperature values and their respective sizes. A higher temperature would tend to rank a given object higher, but a larger size would cause the rank to be reduced. Thus, the ranking of the given object may be based on a combination (e.g., a weighted aggregation) of the temperature value and the size value.

In further examples, identifying an object to retrieve from the data store 104 into the cache memory 130 can further be based on determining which of objects is (are) able to fit in the specified portion of the cache memory 130 allocated to cache objects. If an object would not fit or would take up too much of the specified portion of the cache memory 130 (e.g., take up greater than a specified threshold percentage of the specified portion of the cache memory 130), then the object caching control engine 132 can decide to not select the object for caching.

The object caching control engine 132 schedules (at 308) the retrieval of the identified one or more objects from the data store 104 for storing into the cache memory 130. The scheduling identifies the time slots in which the identified one or more objects are to be retrieved from the data store 104. For example, the object caching control engine 132 can identify which time slots are less busy for the database management node, such as time slots after business hours. In other examples, the time slots in which retrieval of object(s) is scheduled can be based on a command that specifies the time slots to use.

Another factor in deciding, as part of the scheduling, when to retrieve the identified one or more objects into the cache memory 130 is the cost associated with retrieving the objects from the data store 104. The operator of the data store 104 may charge different costs to retrieve objects from the data store 104 at different times (higher prices during business hours). The object caching control engine 132 can schedule the retrieval of the identified objects in time slots to reduce the costs associated with object retrieval.

In some examples, the object caching control engine 132 can maintain a list of object names (e.g., a list 166 shown in FIG. 1) that lists the objects that are present in the cache memory 130. The list of objects 166 can also be stored in the cache memory 130.

After retrieving the identified one or more objects from the data store 104, the object caching control engine 132 can perform (at 310) intelligent placement of the retrieved object(s) according to a temperature of each retrieved object.

For example, the cache memory 130 may be implemented with multiple different memory devices, which may include a first memory device having a lower data access I/O latency, and a second memory device having a higher data access I/O latency. More generally, the different memory devices of the cache memory 130 may have respective different data access I/O latencies. In such examples, a hotter object would be placed in a faster memory device of the cache memory 130, while a less hot object would be placed in a slower memory device of the cache memory 130. For example, the multiple different memory devices of the cache memory 130 may be divided into multiple temperature zones (e.g., a hot zone, a warm zone, and a cold zone). Hot objects can be stored in the hot zone, warm objects (that are cooler than the hot objects can be stored in the warm zone, and cold objects (that are cooler than the warm objects) can be stored in the cold zone.

Also, the cache memory 130 may be implemented with multiple memory devices at different locations within the database management node. For example, the multiple memory devices may include a first memory device connected over a high-speed memory bus to a first processing engine 112, a second memory device connected over a high-speed memory bus to a second processing engine 112, and so forth.

In other examples, memory devices having the same (or similar) performance and/or size can be used to implement the cache memory 130 to allow for even distribution of workload across the memory devices.

Depending on which given processing engine of the processing engines is more likely to access a given object retrieved from the data store 104, the object caching control engine 132 can place the given object in a memory device of the cache memory 130 that is closer to the given processing engine. In other words, the object caching control engine 132 selects a storage location of multiple different storage locations based on a proximity of the selected storage location to the processing engine most likely to retrieve the given object. In some examples, a background process (e.g., a daemon process) can perform background tasks to identify missing objects to fill the cache memory 130 in anticipation of future operations.

More generally, in some examples, multiple candidate placements of objects in the cache memory 130 are possible. The object caching control engine 132 can select, from the multiple candidate placements, a placement of each object in the cache memory 130. For example, a background process can perform read-ahead to proactively fill up the cache memory 130 if space is available.

Once objects 152-i are retrieved into the cache memory 130, the database management node may be able to satisfy a subsequent database query using an object in the cache memory 130. In this scenario, the database management node would not have to access the object in the remote data store 104, which may be associated with a high I/O latency and a higher cost (e.g., if an operator of the data store 104 charges for accesses of objects).

In some examples, before using an object 152-i in the cache memory 130, the database management node may check the last modification time in the field 212 of the corresponding object metadata entry (one of 204-1, 204-2, etc., in FIG. 2), to determine if the object 152-i in the cache memory 130 is stale. For example, the database management node (e.g., a synchronization agent executing in the database management node) can compare the last modification time in the field 212 of the corresponding object metadata entry in the cache memory 130 with the respective last modification time in the last modification time field of an object metadata 140-i in the data store 104. If the last modification time in the field 212 of the corresponding object metadata entry in the cache memory 130 is earlier than the respective last modification time in the last modification time field of an object metadata 140-i in the data store 104, then that indicates the object in the cache memory 130 is stale and should not be used. This object can be invalidated in the cache memory 130, and the corresponding object 114-j can be retrieved from the data store 104 instead.

In further examples, the invalidation of objects can be at the container level. If it is determined that object(s) of a given container in the data store 104 is (are) newer, then all the objects in the given container can be invalidated (e.g., such as when an indicator is set to indicate that all objects of a container are to be invalidated). Otherwise, if the indicator is not set, then staleness is handled on a per-object basis.

If an object for a received database query is not in the cache memory 130, then the database management node can retrieve the object from the data store 104.

By intelligently identifying which objects are to be cached in a database management node, techniques or mechanisms according to some examples allows for more efficient caching of objects that allows for quicker access of objects that are traditionally stored in remote data stores associated with high I/O latencies. Also, costs associated with object access in remote data stores can be reduced.

Figure 4:
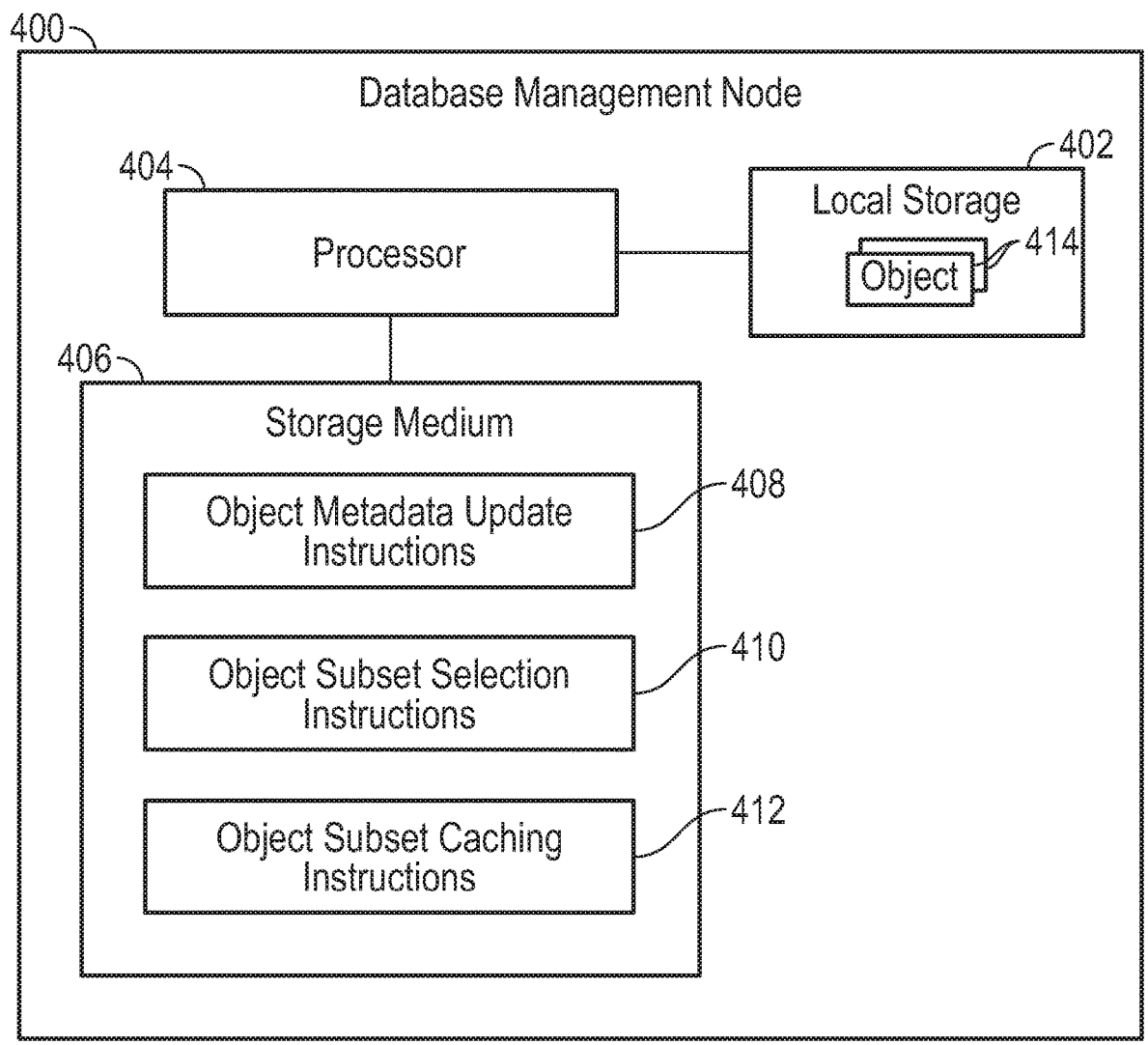
FIG. 4 is a block diagram of a database management node according to some examples.

FIG. 4 is a block diagram of a database management node 400 that includes a local storage 402, a processor 404 (or multiple processors), and a non-transitory storage medium 406 storing machine-readable instructions executable on the processor 404 to perform various tasks. Machine-readable instructions executable on a processor can refer to the instructions executable on a single processor or the instructions executable on multiple processors.

The local storage 402 can be a cache memory, such as the cache memory 130 of FIG. 1.

The machine-readable instructions stored in the storage medium 406 include object metadata update instructions 408 to update object metadata with indicators of access frequencies (e.g., temperatures) of a plurality of objects in a data store (e.g., 104 in FIG. 1) that is remotely accessible by the database management node 400 over a network.

The machine-readable instructions include object subset selection instructions 410 to select a subset of the plurality of objects based on the indicators.

The machine-readable instructions include object subset caching instructions 412 to cache the subset of the plurality of objects in the local storage 402. In FIG. 4, the selected subset includes one or more objects 414 cached in the local storage 402.

A storage medium (e.g., 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database management node comprising:
   a local storage;
   a plurality of processing engines comprising a first processing engine and a second processing engine;
   a processor; and
   a non-transitory storage medium storing instructions executable on the processor to:
   update object metadata with indicators of access frequencies of a plurality of objects in a data store that is remotely accessible by the database management node over a network,
   compute a first indicator of an access frequency of a first object of the plurality of objects based on aggregating a first access frequency statistic and a second access frequency statistic, the first access frequency statistic representing an access frequency of the first object by the first processing engine, and the second access frequency statistic representing an access frequency of the first object by the second processing engine, rank the plurality of objects based on the indicators of access frequencies and sizes of the plurality of objects, wherein a higher access frequency of an object of the plurality of objects causes an increase in a ranking of the object, and a larger size of the object causes a decrease in the ranking of the object, the ranking of the plurality of objects comprising computing a measure representing a first rank of the first object based on aggregating the first indicator and a size of the first object, select a subset of the plurality of objects based on the ranking of the plurality of objects, schedule, in selected one or more time slots, caching of one or more objects of the subset of the plurality of objects in the local storage from the data store, and cache the subset of the plurality of objects in the local storage.

2. The database management node of claim 1, wherein the instructions are executable on the processor to:

retrieve an initial version of the object metadata from the data store, and store the retrieved initial version of the object metadata in a memory of the database management node, wherein the updating of the object metadata comprises updating the initial version of the object metadata in the memory.

3. The database management node of claim 1, wherein the plurality of processing engines are to access data in parallel in response to database queries, wherein the instructions are executable on the processor to:

compute a second indicator of an access frequency of a second object of the plurality of objects based on aggregating a third access frequency statistic and a fourth access frequency statistic, the third access frequency statistic representing an access frequency of the second object by the first processing engine, and the fourth access frequency statistic representing an access frequency of the second object by the second processing engine, wherein the indicators comprise the first indicator and the second indicator.

4. The database management node of claim 1, wherein the instructions are executable on the processor to:

responsive to a database request, determine whether a given object for the database request is stored in the local storage, and in response to determining that the given object for the database request is stored in the local storage, access the given object in the local storage.

5. The database management node of claim 1, wherein the aggregating of the first access frequency statistic and the second access frequency statistic comprises averaging the first access frequency statistic and the second access frequency statistic.

6. The database management node of claim 1, wherein the aggregating of the first indicator and the size of the first object is based on a weighted aggregation of the first indicator and the size of the first object to produce the measure.

7. The database management node of claim 1, wherein the instructions are executable on the processor to pick the one or more time slots that are less busy than another time slot.

8. The database management node of claim 1, wherein the instructions are executable on the processor to select, from a plurality of candidate placements, a placement of an object of the subset in the local storage, and wherein the plurality of candidate placements comprise placements in different storage locations.

9. The database management node of claim 8, wherein a processing engine of the plurality of processing engines is to access data in response to a database request, and wherein the instructions are executable on the processor to select a first storage location of the different storage locations based on a proximity of the first storage location to the processing engine.

10. The database management node of claim 8, wherein the plurality of candidate placements comprise different memory devices having respective different input/output (I/O) latencies with respect to data access, and wherein the instructions are executable on the processor to select a first memory device of the different memory devices to place the first object based on the first indicator of the access frequency of the first object and the I/O latency of the first memory device.

11. The database management node of claim 1, wherein the aggregating of the first indicator and the size of the first object is based on a sum of the first indicator and the size of the first object.

12. A non-transitory machine-readable storage medium comprising instructions that upon execution cause a database system comprising a first processing engine and a second processing engine to:

retrieve a plurality of object metadata from a remote data store over a network, the plurality of object metadata containing information for respective objects of a plurality of objects stored in the remote data store, wherein each object metadata of the plurality of object metadata further includes information relating to a time of modification of a corresponding object;

store the plurality of object metadata in a memory of the database system;

update indicators of access frequencies in the plurality of object metadata based on access of the plurality of objects;

compute a first indicator of an access frequency of a first object of the plurality of objects based on aggregating a first access frequency statistic and a second access frequency statistic, the first access frequency statistic representing an access frequency of the first object by the first processing engine, and the second access frequency statistic representing an access frequency of the first object by the second processing engine;

rank the plurality of objects based on the indicators of access frequencies and sizes of the plurality of objects, wherein a higher access frequency of an object of the objects causes an increase in a ranking of the object, and a larger size of the object causes a decrease in the ranking of the object, the ranking of the plurality of objects comprising computing a measure representing a first rank of the first object based on aggregating the first indicator and a size of the first object;

select a subset of the plurality of objects based on the ranking of the plurality of objects;

cache the subset of the plurality of objects in the memory of the database system; and determine whether the corresponding object is stale based on the information relating to the time of modification.

13. The non-transitory machine-readable storage medium of claim 12, wherein the aggregating of the first access frequency statistic and the second access frequency statistic comprises averaging the first access frequency statistic and the second access frequency statistic.

14. The non-transitory machine-readable storage medium of claim 12, wherein the aggregating of the first indicator and the size of the first object is based on a weighted aggregation of the first indicator and the size of the first object to produce the measure.

15. The non-transitory machine-readable storage medium of claim 12, wherein each object of the plurality of objects contains data in a form different from a relational table used by the database system.

16. The non-transitory machine-readable storage medium of claim 12, wherein the instructions upon execution cause the database system to:
   select, from a plurality of candidate placements, a placement of the first object in the memory, the plurality of candidate placements to place objects in respective different memory devices of the memory, the different memory devices connected to respective different processing engines of the database system,
   wherein the selected placement of the first object comprises selecting a memory device of the different memory devices to store the first object based on a determination that a processing engine connected to the selected memory device is most likely to retrieve the first object.

17. A method of a database system comprising a first processing engine and a second processing engine, the method comprising:
   retrieving a plurality of object metadata from a remote data store over a network, the plurality of object metadata containing information for respective objects of a plurality of objects stored in the remote data store;
   storing the plurality of object metadata in a cache memory of the database system;
   updating temperature values in the plurality of object metadata based on access frequencies of the objects;
   computing a first temperature value representing an access frequency of a first object of the plurality of objects based on aggregating a first access frequency statistic and a second access frequency statistic, the first access frequency statistic representing an access frequency of the first object by the first processing engine, and the second access frequency statistic representing an access frequency of the first object by the second processing engine, wherein the temperature values comprise the first temperature value;
   ranking the plurality of objects based on the temperature values and sizes of the objects, wherein a higher temperature value corresponding to a higher access frequency of an object of the objects causes an increase in a ranking of the object, and a larger size of the object causes a decrease in the ranking of the object, the ranking of the plurality of objects comprising computing a measure representing a first rank of the first object based on aggregating the first temperature value and a size of the first object;
   selecting a subset of the plurality of objects based on the ranking;
   caching, in the cache memory, the subset of the plurality of objects;
   selecting, from a plurality of candidate placements, a placement of the first object of the subset of the plurality of objects in the cache memory, the plurality of candidate placements to place objects in respective different memory devices of the cache memory, the different memory devices connected to respective different processing engines of the database system,
   wherein the selected placement of the first object comprises selecting a memory device of the different memory devices to store the first object based on a determination that a processing engine connected to the selected memory device is most likely to retrieve the first object.

18. The method of claim 17, further comprising:
   scheduling, in selected one or more time slots, caching of one or more objects of the subset of the plurality of objects in the cache memory from the remote data store.

* * * * *